United States Patent [19]

Eichenhofer et al.

[11] 4,056,469
[45] Nov. 1, 1977

[54] PURIFICATION OF WASTE WATER FROM HYDRAZINE PRODUCTION

[75] Inventors: Kurt-Wilhelm Eichenhofer, Leverkusen; Reinhard Schliebs, Cologne, both of Germany

[73] Assignee: Bayer Aktiengesellschaft, Leverkusen, Germany

[21] Appl. No.: 696,253

[22] Filed: June 15, 1976

[30] Foreign Application Priority Data

July 3, 1975 Germany .................. 2529647

[51] Int. Cl.² ............................................. C02C 5/04
[52] U.S. Cl. ............................................. 210/62
[58] Field of Search ..................... 210/50, 59, 62; 260/DIG. 2; 423/407, 408

[56] References Cited

U.S. PATENT DOCUMENTS 3,767,572  10/1973  Bober et al. .................. 210/62
3,923,648  12/1975  Lashley ........................ 210/59

Primary Examiner—Thomas G. Wyse
Attorney, Agent, or Firm—Burgess, Dinklage & Sprung

[57] ABSTRACT

A process for the purification of waste water produced in hydrazine production by the oxidation of ammonia or an amine with an oxidizing agent in the presence of an aldehyde or ketone, comprising intensively mixing the waste water with chlorine or a hypochlorite at a temperature of about 10° C to 110° C and a pH of about 5 to 10 until the treated waste water reaches a redox potential to platinum, relative to Ag/AgCl, of about −400 mV to +800 mV. Advantageously a small amount of waste water is distilled off both before and after the chlorine or hypochlorite treatment.

9 Claims, 1 Drawing Figure

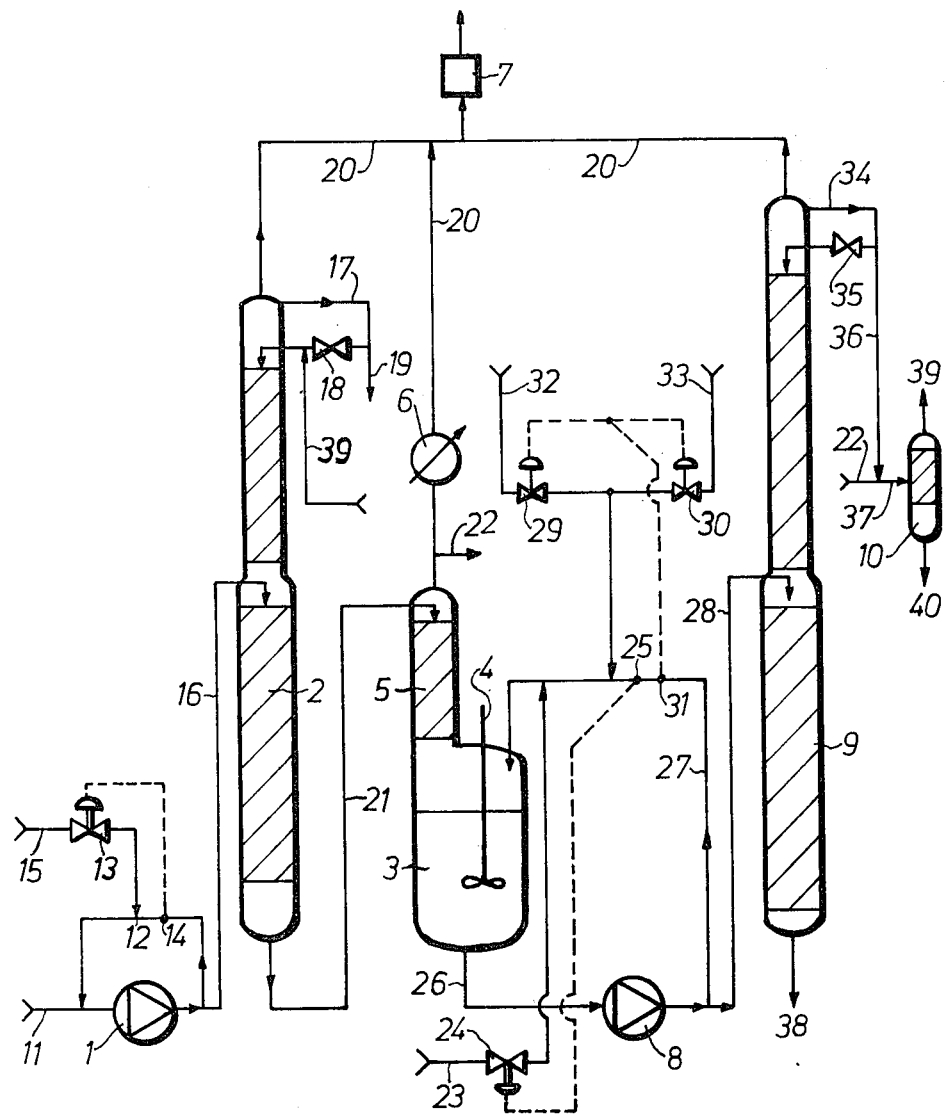

PURIFICATION OF WASTE WATER FROM HYDRAZINE PRODUCTION

The present invention relates to a process for the purification of waste water resulting during the production of hydrazine from aldehydes or ketones. There are a number of known processes for the production of hydrazines using aldehydes or ketones, in which ammonia (or primary amines) is reacted with aldehydes or ketones in the presence of specific oxidizing agents, such as chlorine or $H_2O_2$, in most cases by way of the intermediate products hydrazone and ketazine or diaziridine, to form hydrazine (U.S. Pat. Nos. 2,993,758, 3,077,383; German Offenlegungsschrift No. 2,127,229, U.S. Pat. Nos. 3,869,541, 3,892,805, 3,803,071).

The organic hydrazine derivatives, such as hydrazones, aldazines, ketazines or diaziridines are usually removed from the reaction mixture by distillation (U.S. Pat. No. 3,494,737 German Offenlegungsschrift No. 2,361,932) and subsequently converted hydrolytically into hydrazine hydrate and aldehyde or ketone (German Pat. No. 1,259,859, U.S. Pat. No. 3,481,701, British Pat. No. 1,129,613) or converted by the addition of an acid into hydrazine salts (U.S. Pat. No. 3,010,790).

The waste water occurring in these known processes as a rule still contains small quantities of compounds of hydrazine with the aldehydes or ketones, for example hydrazones, ketazines or diaziridines, and in small quantities hydrazine itself. When acetone is reacted with ammonia (or amine) and oxidizing agents, the waste water contains, for example, dimethyl hydrazone and/or dimethyl ketazine and/or 3,3-dimethyl diaziridine. The waste waters also contain, in smaller quantities, a number of partially unidentifiable organic compounds. Depending on the embodiment of the hydrazine production process the waste waters can contain salts, such as chlorides, sulfates, carbonates, hydrogen carbonates, acetates, formates, hydroxides, cyanates, cyanides, etc. of sodium, potassium, calcium or ammonium, and other organic compounds, such as alcohols or amines.

Owing to its toxicity it has only been possible to introduce industrial waste water resulting during hydrazine production into biological purification installations by diluting it heavily with other waste waters.

It is therefore of great interest to subject waste waters resulting during hydrazine production to a purification which quantitatively removes the hydrazine and the organic hydrazine derviatives. If the waste water contains large quantities of sodium chloride as a by-product of hydrazine production it is necessary to remove these solutions of organic compounds containing sodium chloride, according to a hitherto unknown and particularly useful proposal; chlorine can be produced from the sodium chloride in a subsequent chlorine-alkali-electrolysis and used as an oxidizing agent for the production of hydrazines (recycling). Purified waste waters containing sodium chloride can also be used for the regeneration of ion exchangers, as cooling sols or in dye production.

The purification of dimethylhydrazine containing waste waters by means of sodium chlorite is known (German Auslegeschrift No. 1,242,515). However, the use of sodium hypochlorite only apparently led to the desired elimination of dimethylhydrazine. The reaction time of 24 hours specified for dimethylhydrazine removal is however uneconomic for large scale waste water purification. In addition, a waste water purification at the acid pH of approximately 1.5 necessary when using sodium chlorite, represents a greater consumption of acid and base.

The object of the present invention is a quick and economic process for the removal of the disruptive components in waste waters containing hydrazine.

This object is realized by the present invention involving a process for the purification of waste water, such as that arising in hydrazine production by the oxidation of ammonia (or amines) with oxidizing agents in the presence of aldehydes or ketones, which is characterized in that the waste water is treated at temperatures of about 10° C to 110° C and at pH values of about 5 to 10 by intensively mixing with chlorine or hypochlorite, until a redox potential, relative to Ag/AgCl, of about −400 mV to +800 mV has been reached in the treated waste water.

It has been found that, according to the process of the application, at specific temperatures, specific pH values and specific redox potentials a practically quantitative elimination of organic hydrazine derivatives and hydrazine takes place using practically stoichiometric quantities of chlorine or hypochlorite, which for example in the case of dimethyl ketazine as the waste water constituent can be described by the following formal equation (1):

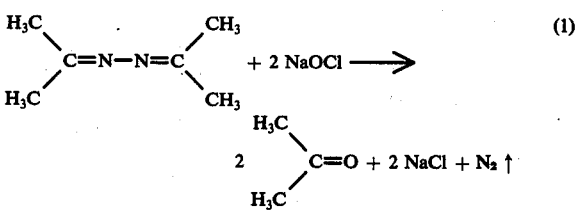

For the implementation of the waste water treatment process according to the invention an extensive separation beforehand of organic acid radicals, e.g. acetate and formate down to low concentrations of approximately 0.1% by weight is advantageous, since in their presence there occurs a corresponding increased consumption of chlorine or hypochlorite. This separation can for example take place by distillation or ion exchange, and in the case of distillation the organic acid radicals remain in the distillation residue. Ammonium salts, which are present in the waste water, are usefully converted by the addition of lyes, releasing ammonia, into potassium, sodium or calcium salts. The quantity of ammonia in the waste water should not exceed about 0.1% by weight.

The pH value to be maintained according to the process of the invention can be adjusted by the addition of acids, such as sulfuric acid or hydrochloric acid, or bases, such as caustic soda or caustic potash solution. In the case of waste water containing sodium chloride, hydrochloric acid or caustic soda in concentrated state (hydrochloric acid approximately 35%, caustic soda approximately 40%) are preferred as the agents regulating the pH value. Chlorine can be used in gaseous or liquid form or dissolved in water. Hypochlorite is preferably used in the form of aqueous solutions (bleaching lye) of the sodium, potassium or calcium salts ("bleaching powder"). Since the waste water from hydrazine production is as a rule alkaline owing to its hydroxide or carbonate content, chlorine is preferred as the oxidizing agent, because it exploits the natural basicity of the waste water and thus the pH range of 5 to 10 according to the invention can be maintained particularly economically. The introduction of chlorine or hypochlorite can be controlled by means of a redox potential measurement, for example by a potential measurement using platinum against a silver-silver chloride electrode. The redox potential of the waste water to be treated using platinum, relative to the comparative electrode silver-silver chloride in 3.5 molar potassium chloride solution (+200 mV against Standard-Hydrogen electrode) should be from approximately −400 to +800 mV, and preferably between about −200 and +700 mV, particularly preferably between about +100 mV and +600 mV. A very small quantity of hydrazine or waste water containing organic hydrazine derivatives corresponds to the negative limit value of the redox potential, and a small quantity of waste water containing chlorine or hypochlorite corresponds to the positive limit value of the redox potential. With the use of reference electrodes other than silver-silver chloride simple related calculations (Elektroorganische Chemie, Verlag Chemie, 1974, Page 103) can be undertaken in known manner.

In place of reaction control by means of redox potential measurement, other known methods for indicating traces of chlorine or hypochlorite, e.g. the potentiostatic methods, can be used for controlling chlorination (G. Teske, Z. Anal. Chem. 216, 286 (1966)).

The introduction of the chlorine or hypohalite, preferably hypochlorite, into the waste water should take place with intensive mixing, for example by means of a suitable stirring system or by circulation. It has been shown, that a particularly good chlorine and hypochlorite distribution is obtained when chlorine or hypochlorite is introduced through a jet into the circulation circuit.

The pH value during the chlorination of the waste water by means of chlorine or hypochlorite should not fall below a value of 5, since with low pH values in the presence of low quantities of ammonia the formation of nitrogen trichloride may take place, although there is still a quantitative reaction between hydrazine or ketazine and chlorine below pH 5. At pH values higher than 10, the reaction speed decreases steeply, and only an incomplete reaction is attained. Thus an aqueous ketazine solution in the presence of hypochlorite at a pH value of 11 with respect to its hydrazine content is hardly changed. A pH value of about 6 to 9 is preferred, and a pH of about 7 to 8.5 is particularly preferred.

The preferred temperature range for the process according to the invention is about 60° to 100° C, and particularly preferred temperatures are about 70° C to 90° C.

The chlorination of the waste water can be conducted under normal pressure or under an excess pressure of up to about 4 bars, however chlorination at normal pressure is preferred. The duration for the chlorination of the waste water by means of chlorine or hypochlorite can be adjusted to about 1 to 30 minutes, but treatment times of under about 10 minutes are preferred.

In a special embodiment of the process according to the invention the waste water, as it generally occurs after the distillation of the organic hydrazine derivatives i.e. of the hydrazones and ketazines by known processes (e.g. U.S. Pat. Nos. 3,494,737, 3,028,316), is subjected, before treatment with chlorine or hypochlorite, to a brief distillation (stripping), firstly in order to partially evaporate any volatile components still present, such as ketones, e.g. acetone, or ketazines, e.g. dimethyl ketazines, and secondly to adjust a specific and a constant content of organic hydrazine derivatives and hydrazine, of about 0.01 to 0.1% by weight (calculated as hydrazine and in relation to waste water). Waste water having such a hydrazine content of organic hydrazine derivatives and hydrazine is especially suitable for the process according to the application. To obtain a waste water of this type, it is generally sufficient to distil off up to 10% by volume of the waste water originally present. A reduction of the chlorine or hypochlorite consumption in the subsequent waste water treatment is achieved by reducing the content of organic hydrazine derivatives and optionally hydrazine. Possible chlorination of the organic compounds is avoided by a reduction of the content of organc compounds in the waste water- a means of measuring this is the total organic carbon (TOC = total organic carbon values). The distillation causes a TOC reduction of up to about 50% and a reduction of hydrazine compounds, expressed as hydrazine, of up to about 25%. Since the TOC-waste water values of hydrazine waste waters occurring after the distillation of the organic hydrazine derivatives by known processes, are generally between approximately 600 and 1000 ppm, by means of the distillation of this waste water according to the invention a reduction of this TOC value to approximately 300 to 500 ppm is achieved. The condensate obtained in distillation, which mainly contains aldehydes, or ketones and aldazine or ketazine as well as water in quantities of from approximately 1 to 20% by weight, can be simply returned to the hydrazine production process. The stripping of the waste water takes place in the presence of chloride at pH values of about 7 to 13, and in addition it can also take place in the acid pH range.

In a particularly preferred embodiment of the process according to the invention, the distillation of up to about 5% by volume of the waste water treated with chlorine or hypochlorite takes place regardless of whether a distillation has taken place according to the special embodiment described before the treatment according to the invention with chlorine or hypochlorite. This distillation in conjunction with the chlorination or hypochlorination of the waste water takes place preferably at pH values of about 7 to 8.5. As with the distillation of the waste water before treatment with chlorine or hypochlorite, this distillation can be conducted at normal pressure or under vacuum (for example by flash evaporation). In this process, quantities of preferably under about 1% by volume of the waste water previously treated with chlorine or hypochlorite are distilled, and a concentration of the organic components takes place.

The invention will be further described with reference to the accompanying drawing which is a schematic flow sheet of an apparatus for the purification of waste water produced in hydrazine production, employing acetone as ketone containing sodium chloride.

In this FIGURE the numbers have the following meanings:

1 = pump
2 = distillation column
3 = chlorination container
4 = stirrer
5 = scrubber
6 = exhaust gas cooler
7 = activated carbon container
8 = pump
9 = distillation column 10 = separator
11, 12 = pipes
13 = control valve
14 = pH measuring point
15 = pipe for addition of acid or base
16 = pipe
17 = condensate outlet
18 = condensate return
19 = condensate removal
20 = exhaust gas pipe
21 = pipe for sump discharge
22 = exhaust gas condensate pipe
23 = pipe for chlorine gas or hypochlorite
24 = control valve
25 = redox measuring point
26, 27, 28 = pipes
29, 30 = control valves
31 = pH measuring point
32 = acid inlet
33 = base inlet
34 = condensate outlet
35 = condensate return
36 = condensate removal
37 = pipe
38 = sump discharge
39 = removal light phase
40 = removal heavy phase.

Referring now more particularly to the drawing the sump discharge from the ketazine separation which occurs according to the known process of U.S. Pat. No. 3,494,737, which contains approximately 10% by weight of sodium chloride, approximately 500 to 1000 ppm $N_2H_4$ and approximately 500 to 1100 ppm of organic carbon (TOC), is introduced through pipe 11 to pump 1 which pumps the waste water through 16 into the distillation column 2. Part of the waste water is returned via 12 through the pH measuring point 14, and acid or base can be added via pipe 15 and a specific pH value obtained by control valve 13. The condensate led off via 17, which can be partially returned as reflux to column 2 via 18 for the purpose of concentration, is removed via 19 and returned to the ketazine distillation. The sump discharge from column 2 passes via 21 first into the scrubber 5 in which the countercurrent exhaust gas is scrubbed and then into the chlorination container 3, the contents of which are stirred by stirrer 4, in order to achieve good distribution of the chlorine gas flowing in through the control valve 24 out of pipe 23 into pipe 27. At the same time a redox potential measurement takes place at the measuring point 25 in pipe 27. The exhaust gases are separated in the cooler 6, from entrained liquid, and the two phase exhaust gas condensate is led off via 22. The exhaust gases are fed via 20 for further purification in the activated carbon container 7, after which they pass into the atmosphere. Pump 8 pumps part of the waste water via 26 and 27 out of the container 3. The pH is measured at 31 and is controlled by the acid flowing in through 32 and the base flowing in through 33 by means of the control valves 29 and 30. The waste water then passes into the distillation column 9 via pipe 28. The hydrazine-free waste water which has also been freed to a great extent from organic compounds leaves the column 9 via 38, for further processing. The condensate leaves the column 9 via 34 and is partially returned into the column 9 via 35 for the purpose of concentration. Then the two phase distillate with from 2 to 70% by weight of total organic proportions flows through pipe 36 and 37 together with exhaust gas condensates from pipe 22 into the separator 10. The aqueous upper phase leaves the separator via 39 and can be returned to the column 2 via pipe 18. The organic lower phase can be removed via 40 and burned.

With the process according to the invention it is possible to remove organic hydrazine derivatives and hydrazine in waste waters from hydrazine production to such a degree that only quantities of from less than 0.5 ppm to quantities of less than 0.01 ppm (analytical limits of detection of photometric determination with p-dimethylaminobenzaldehyde) are present in the waste water.

The exhaust gas generated by the process according to the invention contains, essentially as a function of the pH value and temperature, nitrogen and carbon dioxide. The purified waste water contains organic carbon in quantities of approximately 100 to 200 ppm and this waste water can be introduced directly into purification filter plants. If waste water resulting during the production of hydrazine using chlorine or hypochlorite as an oxidizing agents, is used in the process according to the invention there occurs a sodium chloride solution of approximately 11% by weight, which, after suitable concentration to the saturation concentration of approximately 26% by weight, can be added to a chlorine-alkali-electrolysis for the purpose of reclaiming chlorine and caustic soda for hydrazine production (recycling).

The process according to the invention can be conducted discontinuously or continuously in conventional columns and agitator vessels. For large scale processes however, the continuous method is preferred. The process according to the invention is very easy to implement using conventional measuring and control equipment and the utilization of the chlorine and/or hypochlorite is practically quantitative.

The process according to the invention is illustrated in greater detail in the following examples. Hydrazine and the organic hydrazine derivatives, such as hydrazone, ketazine and diaziridine, were determined according to known methods iodometrically or photometrically with para-dimethylaminobenzaldehyde (limit of detection 0.01 ppm). $N_2H_4$ in the following examples signifies the sum of hydrazine and organic hydrazine compounds calculated as hydrazine. TOC (total carbon content) and I.C. (inorganic carbon content) were each determined according to known methods. Chloride, $BOD_5$ (biological oxygen demand after 5 days) COD (chemical oxygen demand) and Rest-N(ammonia, nitrate, nitrite, organic nitrogen) were ascertained according to standard processes.

EXAMPLE 1

1 liter of water containing 200 ppm dimethylketazine was titrated at 20° C at varying pH values potentiometrically (electrodes: Pt/Ag/AgCl) with 0.1 N sodium hypochlorite solution until a change in potential occurred.

| pH | consumption of NaOCl in mole | reaction in % relative to $N_2H_4$-content |
|---|---|---|
| 1 | 3.36 | 94.8 |
| 3 | 3.47 | 97.9 |
| 5 | 3.50 | 98.8 |
| 7 | 3.45 | 97.3 |
| 11 | no perceptible change | |

EXAMPLE 2

1 liter of hydrazine waste water containing 430 ppm TOC and 472 ppm $N_2H_4$ (iodometric analysis after boiling off acetone) as well as, amongst other things, acetone, dimethyl hydrazone and dimethyl ketazine, is titrated potentiometrically at 20° C with 0.1 N sodium hypochlorite solution until a change in potential occurs.

| pH | change in potential [Δ mV] | consumption of NaOCl in m mole | reaction in % relative to $N_2H_4$-content |
|---|---|---|---|
| 1 | 760 | 31.2 | 105 |
| 3 | 740 | 32.6 | 110 |
| 5 | 620 | 33.6 | 114 |
| 7 | 600 | 35.0 | 118 |
| 9 | 600 | 33.8 | 114 |
| 12.7 | 500 | 22.1 | 75 |

EXAMPLE 3

Chlorine gas in a quantity of 1 liter per hour is introduced into 1 liter of hydrazine waste water containing 487 ppm $N_2H_4$ and 510 ppm TOC at 25° C and at varying initial pH values. The introduction of chlorine gas water terminated after a change in potential. The quantity of chlorine introduced was 28.7 mMole $Cl_2 \geq$ 94.4% reaction relative to $N_2H_4$.

| pH start | pH end | Redox potential start [mV] | Redox potential end [mV] | ppm $N_2H_4$ after chlorination |
|---|---|---|---|---|
| 12.34 | 8.92 | −650 | +780 | 0.7 |
| 12.0 | 1.4 | −620 | +1000 | 0.5 |

EXAMPLE 4

1 liter of waste water containing 510 ppm TOC, 487 ppm $N_2H_4$ and 137 ppm radical-N, is treated with chlorine gas under potentiometric control of the redox potential until a change in potential takes place and subsequently distilled to 5% by volume relative to the initial volume (1 theoretical plate).

| pH after chlorination | Redox potential start [mV] | Redox potential end [mV] | TOC | $N_2H_4$ | Radical-N |
|---|---|---|---|---|---|
| 8.82 | −640 | +760 | 163 | 0.13 | 31 |
| 0.9 | −490 | +920 | 176 | 0.22 | 73 |

EXAMPLE 5

The experiment is carried out as in Example 4, but at constant pH.

| pH chlorination | Redox potential start | Redox potential end | TOC | $N_2H_4$ | Radical-N |
|---|---|---|---|---|---|
| 7 | −322 | +325 | 146 | 1.85 | 1.4 |
| 5 | + 30 | +412 | 144 | 0.14 | 1.4 |
| 3 | + 54 | +980 | 148 | 0.08 | 1.4 |

EXAMPLE 6

Waste water containing 510 ppm TOC, 487 ppm $N_2H_4$ and 137 ppm radical-N, and 2N-hydrochloric acid is continuously pumped to a 1 liter flask equipped with external heating, bottom discharge, stirrer, chlorine inlet tube, pH-, Pt-, Ag/AgCl-electrode and a descending tube with cooler. At the same time chlorine gas is introduced in a finely distributed form and distillation occurs (one stage process). The chlorine consumption was 31.2 mMole $Cl_2$/liter of waste water (theoretical relative to $N_2H_4$: 30.4 mMole). The hydrochloric acid consumption was 22 mMole HCl/liter of waste water.

| Experiment | A | B |
|---|---|---|
| Throughput (l/h) | 4 | 2 |
| pH | 5 – 8 | 5 – 8 |
| Redox potential (mV) | 0 to +250 | +250 to +500 |
| Distillate (Vol.-%) | 3.8 | 5.5 |
| T (° C) | 103 | 103 |
| Discharge sump | | |
| TOC (ppm) | 128 | 132 |
| $N_2H_4$ (ppm) | 0.35 | 0.02 |
| radical-N (ppm) | 1.0 | 7.1 |
| COD (mg/l) | 140 | 770 |
| $BOD_5$ (mg/l) | 100 | 105 |
| Chloride (mg/l) | 78100 | 80940 |
| Distillate: | | |
| Acetone (g/l) | 8.0 | 3.3 |

EXAMPLE 7

The waste water preparation was carried out as in Example 6, but in two stages. The distillation took place in a mirror column (length: 90 cm; diameter 45 cm; packing 5 mm Raschig rings) with the waste water treated with chlorine fed in at the head of the column. The throughput was approximately 4 liters per hour.

| pH | average duration in minutes | Vol. - % | TOC | $N_2H_4$ | Radical-N | $BOD_5$ |
|---|---|---|---|---|---|---|
| 1 | 30 | 5.72 | 136 | 0.01 | 39 | |
| 4 | 30 | 5.75 | 108 | 0.01 | 36 | |
| 9 | 30 | 4.2 | 224 | 0.03 | 20 | |
| 9 | 10 | 5.4 | 224 | 0.02 | 41 | 300 |

Bacteria toxicity in the sump: Bact. Coli: 1 : 1.

EXAMPLE 8

The waste water preparation was conducted as in Example 7. However, a distillation was effected before chlorination (three stage process).

| Experiment | Stage | pH | Vol % distillate | Redox potential(mV) | Acid/Base consumption (m Mole/l) | TOC | IC | $N_2H_4$ | Radical-N | $BOD_5$ |
|---|---|---|---|---|---|---|---|---|---|---|
| | waste water | | | | | 468 | — | 423 | 107 | |
| A | stripping | 12.5 | 4.5 | — | 0 | 375 | — | 408 | 1.5 | |
| | $Cl_2$/stripping | 8.8 | 6.6 | +800 | 0 | 161 | — | 0.1 | 15 | 160 |
| B | stripping | 8.0 | 4.5 | — | 95 HCl | 306 | — | 306 | 69 | |
| | $Cl_2$/strip- | 8.75 | 8.4 | +900 | 73 NaOH | 135 | — | 0.1 | 15 | |

-continued

| Experiment | Stage | pH | Vol % distillate | Redox potential(mV) | Acid/Base consumption (m Mole/l) | TOC | IC | N$_2$H$_4$ | Radical-N | BOD$_5$ |
|---|---|---|---|---|---|---|---|---|---|---|
|  | ping |  |  |  |  |  |  |  |  |  |
|  | waste water |  |  |  |  | 1020 | 200 | 512 | 134 |  |
| C | stripping | 7.5 | 5.4 | — | — | 738 | 102 | 376 | 1 |  |
|  | Cl$_2$/stripping | 8.0 | 6.0 | +700 | — | 280 | 35 | 0.3 | 1 | 350 |

Bacteria toxicity in the sump: Experiment C: Bact. Coli: 1 : 2
Pseudomonas fluor: 1 : 2
necessary dilution for biological purification. 1 : 1 − 2 : 1

EXAMPLE 9

Waste water containing 800 to 1100 ppm TOC, 110 – 300 ppm IC and 600 to 1000 ppm N$_2$H$_4$ was purified in a continuously working experimental installation according to the figure. Every hour 420 liters of waste water at 80° C and pH value of 10.9 were pumped through pipe 11 into column 2, which was activated with 90 kg vapor/hour. At a reflux ratio of 50:1, every hour 0.9 to 1.2 liters of a 4% by weight, aqueous acetone solution, containing some ketazine, were removed at the head of the column. The sump discharge containing 370 to 520 ppm TOC, 150 to 200 ppm IC and 650 ppm N$_2$H$_4$ was introduced into the chlorination container 3. The hourly addition of approximately 3.7 kg chlorine at a redox potential of −50 to +100 mV and a mean residence time of 5 to 6 minutes was effected by introducing the chlorine gas at the bottom of the container and by fine distribution by means of a stirrer. At 80° C a pH value of 7.0 to 8.0 was maintained by the addition of 40% caustic soda. The exhaust gas, in a quantity of 0.2 m$^3$ per hour, contained no chlorine. The exhaust gas condensate consisted of 98.5% water and a small quantity of heavy phase. After leaving the container 3 the waste water contained 455 ppm TOC, 40 to 70 ppm IC and 0.5 to 1 ppm N$_2$H$_4$, but no chlorine. It was then fed through pipe 28 of column 9, which was charged with 80 kg vapor/hour. At a reflux ratio of 50:1 and a head temperature of 98° C the distillate was fed to the separating apparatus 10. Approximately 0.9 to 1.1 liters of the lighter phase, containing 9.2 to 10.2% by weight of acetone and approximately 90% by weight of water, were drawn off per hour through pipe 39, and approximately 0.06 liters of the heavier phase containing approximately 40% by weight of organic chlorine were drawn off per hour through pipe 40. The purified waste water flowing out through pipe 38 having a pH value of approximately 8.8 contained 168 to 198 ppm TOC, 42 to 58 ppm IC, 0.2 to 0.3 ppm N$_2$H$_4$ and 12.3% by weight sodium chloride, but no chlorine. The BOD$_5$ was 140 mg/l.

EXAMPLE 10

In contrast to Example 9 chlorine gas was introduced through a nozzle into the circulating flow in pipe 27, thus obtaining a better chlorine distribution. The redox potential was maintained at +500 to +700 mV. Under otherwise similar conditions the waste water contained 140 to 175 ppm TOC and 0.1 to 0.2 ppm N$_2$H$_4$, but no chlorine. The lighter phase of the distillate contained 6.5% by weight acetone and the heavier phase 13% by weight acetone and 3% by weight chloroform in addition to other non-identified compounds.

It will be appreciated that the instant specification and examples are set forth by way of illustration and not limitation, and that various modifications and changes may be made without departing from the spirit and scope of the present invention.

What is claimed is:

1. A process for the purification of waste water produced in hydrazine production by the oxidation of ammonia or amine with an oxidizing agent in the presence of an aldehyde or ketone, such waste water containing small amounts of hydrazine and organic hydrazine derivatives, comprising intensively mixing the waste water with chlorine or a hypochlorite at a temperature of about 10° C to 110° C and a pH of about 5 to 10 until the treated waste water reaches a redox potential to platinum, relative to Ag/AgCl, of about −400 mV to +800 mV.

2. A process according to the claim 1, wherein chlorination or hypochlorination is conducted for about 1 to 30 minutes.

3. A process according to claim 1, wherein the waste water initially contains hydrazine and organic hydrazine derivatives (calculated as hydrazine) in about 100 to 1000 ppm.

4. A process according to claim 1, wherein the waste water is treated at a temperature of about 60° to 100° C and a pH of about 6 to 9 with chlorine or hypochlorite until the treated waste water reaches a redox potential to platinum, relative to Ag/AgCl, of about −200 to +700 mV.

5. A process according to claim 1, wherein chlorination or hypochlorination is carried out until an ammonia or ammonium content of less than about 0.1% by weight is reached in the waste water.

6. A process according to claim 1, wherein before treatment with chlorine or hypochlorite up to about 10% by volume of the waste water is distilled off.

7. A process according to claim 1, wherein after treatment with chlorine or hypochlorite up to about 1% by volume of the treated water is distilled off.

8. A process according to claim 1, wherein the treated waste water containing sodium chloride is subjected to a chlorine-alkali-electrolysis and the chlorine and caustic soda formed are recycled to hydrazine production.

9. A process according to claim 1, wherein the waste water initially contains hydrazine and organic hydrazine derivatives (calculated as hydrazine) in about 100 to 1000 ppm, before treatment with chlorine or hypochlorite up to about 10%, by volume of the waste water is distilled off, the waste water is treated at a temperature of about 70° to 90° C and a pH of about 7 to 8.5 with chlorine or hypochlorite for about 1 to 10 minutes until the treated waste water reaches a redox potential to platinum, relative to Ag/AgCl, of about +100 to +600 mV, and up to about 1% by volume of the treated water is then distilled off.

* * * * *